US012515608B2

(12) United States Patent
Acker et al.

(10) Patent No.: US 12,515,608 B2
(45) Date of Patent: Jan. 6, 2026

(54) VEHICLE OCCUPANT RESTRAINING SYSTEM COMPRISING A CENTRAL AIRBAG

(71) Applicant: ZF AUTOMOTIVE GERMANY GMBH, Alfdorf (DE)

(72) Inventors: Dominique Acker, Gschwend (DE); Jürgen Scherr, Waldstetten (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/840,945

(22) PCT Filed: Feb. 22, 2023

(86) PCT No.: PCT/EP2023/054390
§ 371 (c)(1),
(2) Date: Aug. 23, 2024

(87) PCT Pub. No.: WO2023/161260
PCT Pub. Date: Aug. 31, 2023

(65) Prior Publication Data
US 2025/0170979 A1    May 29, 2025

(30) Foreign Application Priority Data
Feb. 24, 2022  (DE) .................. 10 2022 104 373.8

(51) Int. Cl.
*B60R 21/207* (2006.01)
*B60R 21/231* (2011.01)
(Continued)

(52) U.S. Cl.
CPC ...... *B60R 21/207* (2013.01); *B60R 21/23138* (2013.01); *B60R 21/233* (2013.01);
(Continued)

(58) Field of Classification Search
CPC ............... B60R 21/207; B60R 21/233; B60R 21/23138
See application file for complete search history.

(56) References Cited

U.S. PATENT DOCUMENTS 8,282,126 B2 * 10/2012 Wiik .................. B60R 21/233
280/730.2
9,004,526 B2 *  4/2015 Fukawatase ........ B60R 21/214
280/729
(Continued)

FOREIGN PATENT DOCUMENTS

DE    102013015141 A1    3/2015
DE    102020124148 A1    3/2022
(Continued)

OTHER PUBLICATIONS

International Search Report for International Application No. PCT/EP2023/054390, with a mailing date of May 31, 2023, 4 pages.

*Primary Examiner* — Faye M Fleming
(74) *Attorney, Agent, or Firm* — Tarolli, Sundheim, Covell & Tummino LLP

(57) ABSTRACT

A vehicle occupant restraint system (10) includes a center airbag (12) which, in an inflated state, extends between two vehicle seats (14) positioned next to each other and which has an inflatable torso gas bag (16) and an inflatable head gas bag (18) connected to the torso gas bag (16). The torso gas bag (16) comprises a laterally projecting, as seen in the longitudinal direction of the vehicle (L), inflatable protrusion (36) which is designed and arranged to abut, in the completely inflated state of the center airbag (12), against a vehicle structure (32) between the vehicle seats (14) and to support the center airbag (12) against a lateral force (F).

8 Claims, 4 Drawing Sheets

(51) Int. Cl.
*B60R 21/233* (2006.01)
*B60R 21/237* (2006.01)

(52) U.S. Cl.
CPC .... *B60R 21/237* (2013.01); *B60R 2021/2074* (2013.01); *B60R 2021/23146* (2013.01); *B60R 2021/23161* (2013.01); *B60R 2021/23308* (2013.01); *B60R 2021/23324* (2013.01)

(56) References Cited

U.S. PATENT DOCUMENTS

| | | | | |
|---|---|---|---|---|
| 9,016,718 | B2* | 4/2015 | Fukawatase | B60R 21/233 |
| | | | | 280/730.2 |
| 11,091,114 | B2 | 8/2021 | Komura | |
| 11,407,376 | B2* | 8/2022 | Moon | B60R 21/23138 |
| 11,440,499 | B2* | 9/2022 | Shibahara | B60R 21/20 |
| 11,491,946 | B2* | 11/2022 | Azuma | B60R 21/23138 |
| 11,661,026 | B2* | 5/2023 | Jo | B60R 21/23138 |
| | | | | 280/730.2 |
| 11,731,576 | B2* | 8/2023 | Fuma | B60R 21/207 |
| | | | | 280/729 |
| 11,912,225 | B2* | 2/2024 | Azuma | B60R 21/23138 |
| 12,134,363 | B2* | 11/2024 | Ueda | B60R 21/207 |
| 2021/0339698 | A1 | 11/2021 | Azuma et al. | |
| 2022/0242356 | A1* | 8/2022 | Bogdanovic | B60R 21/23138 |
| 2024/0140348 | A1* | 5/2024 | Jang | B60R 21/231 |

FOREIGN PATENT DOCUMENTS

| | | |
|---|---|---|
| EP | 3954587 A1 | 2/2022 |
| JP | 2014069729 A | 4/2014 |
| JP | 2019034710 A | 3/2019 |

\* cited by examiner

VEHICLE OCCUPANT RESTRAINING SYSTEM COMPRISING A CENTRAL AIRBAG

RELATED APPLICATIONS

This application is a U.S. National Stage Application filed under 35 USC 371 claiming priority to Serial No. PCT/EP2023/054390, filed on 22 Feb. 2023; which claims priority from DE Patent Application 10 2022 104 373.8, filed 24 Feb. 2022, the entireties of which are hereby incorporated herein by reference.

TECHNICAL FIELD

The invention relates to a vehicle occupant restraint system comprising a center airbag.

BACKGROUND

In order to prevent vehicle occupants in two vehicle seats arranged next to each other from over-swinging beyond the seat in the event of a side impact, it is known to arrange an airbag between the two vehicle seats. Such airbag is also referred to as center airbag.

Known center airbags are maintained in position e.g. via tensioning straps and/or externally attached positioning devices. However, the use of those tensioning straps and/or positioning devices is expensive and increases the space required as well as the manufacturing costs.

SUMMARY

It is the object of the invention to stabilize a center airbag in a simple manner to enhance cushioning of the vehicle occupant.

This object is achieved by a vehicle occupant restraint system comprising a center airbag which in an inflated state extends between two vehicle seats positioned next to each other and which includes an inflatable torso gas bag and an inflatable head gas bag connected to the torso gas bag. The torso gas bag has, as seen in the longitudinal direction of the vehicle, a laterally projecting inflatable protrusion which is designed and arranged to abut on a vehicle structure between the vehicle seats, when the center airbag is completely inflated, and to support the center airbag against a lateral force.

By the interaction of the inflatable protrusion with the vehicle structure, the center airbag can easily apply a counterforce which restrains the vehicle occupant in their seat.

The inflatable protrusion comprises only a small part of the total volume of the torso gas bag so that a shape having a supporting effect can be imparted to the center airbag by merely a small additional volume which does not result in a significant time delay when the center airbag is filled.

The inflatable protrusion does not directly contribute to restraining the vehicle occupant. As a rule, the inflatable protrusion is arranged on the side of the center airbag facing away from the vehicle occupant in the associated vehicle seat. It is the only function of the inflatable protrusion to support the center airbag on the vehicle structure.

For example, an angled or curved contact surface which fully abuts against an edge or a bulge of the vehicle structure is formed by the inflatable protrusion at the torso gas bag. This results in a full-surface support which enables high lateral force take-up by the vehicle structure. The shape of the contact surface and the shape of the vehicle structure should be adapted to each other so as to achieve the full-surface contact.

The vehicle structure preferably is a center console of the vehicle. Accordingly, the inflatable protrusion is usually formed in a lower area of the torso gas bag.

The center airbag can be mounted to a backrest of one of the vehicle seats, specifically a driver seat, as this is known from conventional side airbags.

Preferably, the torso gas bag has an inflation portion that is fixed to the backrest so that the torso gas bag is stabilized, on the one hand, by fixation on the backrest and, on the other hand, by the contact surface on the vehicle structure.

The inflatable protrusion can be easily realized by a cut of the torso gas bag having first and second portions which, relating to the inflated center airbag, are connected to each other along mirror-inverted outer contours, wherein the second portion includes a folding area constituting the inflatable protrusion in the inflated center airbag, wherein the folding area comprises an outer edge portion which is connected to itself only in superimposed segments of the folding area. The outer edge portion of the folding area defines the contact surface of the inflatable protrusion later in the completed and inflated state of the center airbag.

A total area of the second portion of the cut of the torso gas bag preferably corresponds to a total area of the first portion of the cut plus a surface of the folding area. The surface of the folding area thus defines the volume of the inflatable protrusion.

The folding area is preferably arranged in the surface of the second portion, wherein all delimitations of the folding area against the remaining part of the second portion may be merely theoretical.

In a preferred variant, the folding area comprises a first folding line extending from a terminal point at the circumferential contour of the torso gas bag opposite to the contact surface to a first end of the outer edge portion of the folding area, and a second folding line extending from the terminal point to a center of the outer edge portion and dividing the latter into two mirror-symmetrical sub-portions. Both folding lines preferably end in the same terminal point.

The surface of the folding area can be selected to be approximately triangular and can in particular form approximately an isosceles acute triangle whose vertex is directed to an upper area of the center airbag in the mounted and inflated state. In particular, the terminal point of the folding lines constitutes the vertex of the triangle.

The first folding line forms e.g. a delimitation of the folding area in the surface of the second portion of the cut of the torso gas bag.

The second folding line preferably is a line of symmetry for the folding area so that the second folding line divides the folding area into two equally sized mirror-inverted sections.

The position of the folding area on the surface of the second portion of the cut allows to predetermine the position of the inflatable protrusion in the inflated center airbag. Via the position of the terminal point of the folding lines at the outer contour of the second portion, an angle at which the inflated protrusion projects from the torso gas bag, e.g. relative to a baffle of the torso gas bag, can be influenced.

In order to provide an angled or curved contact surface, the shape of the outer edge portion can be appropriately selected. For example, the outer edge portion of the folding area can be angled or curved and can merge into the adjoining portion of the circumferential contour of the torso gas bag.

Before the mirror-inverted outer contours of the first and second portions are connected, the folding area is folded into the interior or onto the exterior of the center airbag, the outer edge portion being folded once onto itself and the sub-portions thereof being fixed, such as sewn up. Therefore, the outer edge portion of the folding area is not part of the mirror-inverted outer contours of the two portions of the cut connected to each other. In the not inflated center airbag, the folding area forms an outwardly opened pocket that protrudes into the interior of the torso gas bag.

The first and second portions of the cut of the torso gas bag can be connected to each other along a centerline in one piece to reduce the number of the cut parts. Preferably, also the folding area is formed in one piece with the second portion. In this case, the centerline is part of a circumferential contour of the completed torso gas bag along which the cut portions are interconnected.

The cover of the torso gas bag preferably consists of the first and second portions of the cut. All cut parts of outer wall portions of the center airbag advantageously can be flatly spread separately each per se to facilitate manufacture.

The head gas bag and the torso gas bag may form separate inflatable chambers of the center airbag and may be fastened to each other in a connecting area having at least one overflow orifice. In particular, a lower portion of the head gas bag may cover an upper portion of the torso gas bag in the inflated center airbag. The head gas bag may be designed in any other suitable manner, however.

The inflatable protrusion at the torso gas bag allows to achieve a support of the center airbag on the vehicle by a merely slight increase in volume, and allows to better stabilize the center airbag when cushioning the vehicle occupant.

BRIEF DESCRIPTION OF THE DRAWINGS

In the following, the invention shall be illustrated by means of an embodiment with reference to the attached figures, wherein.

DESCRIPTION

Figure 1:
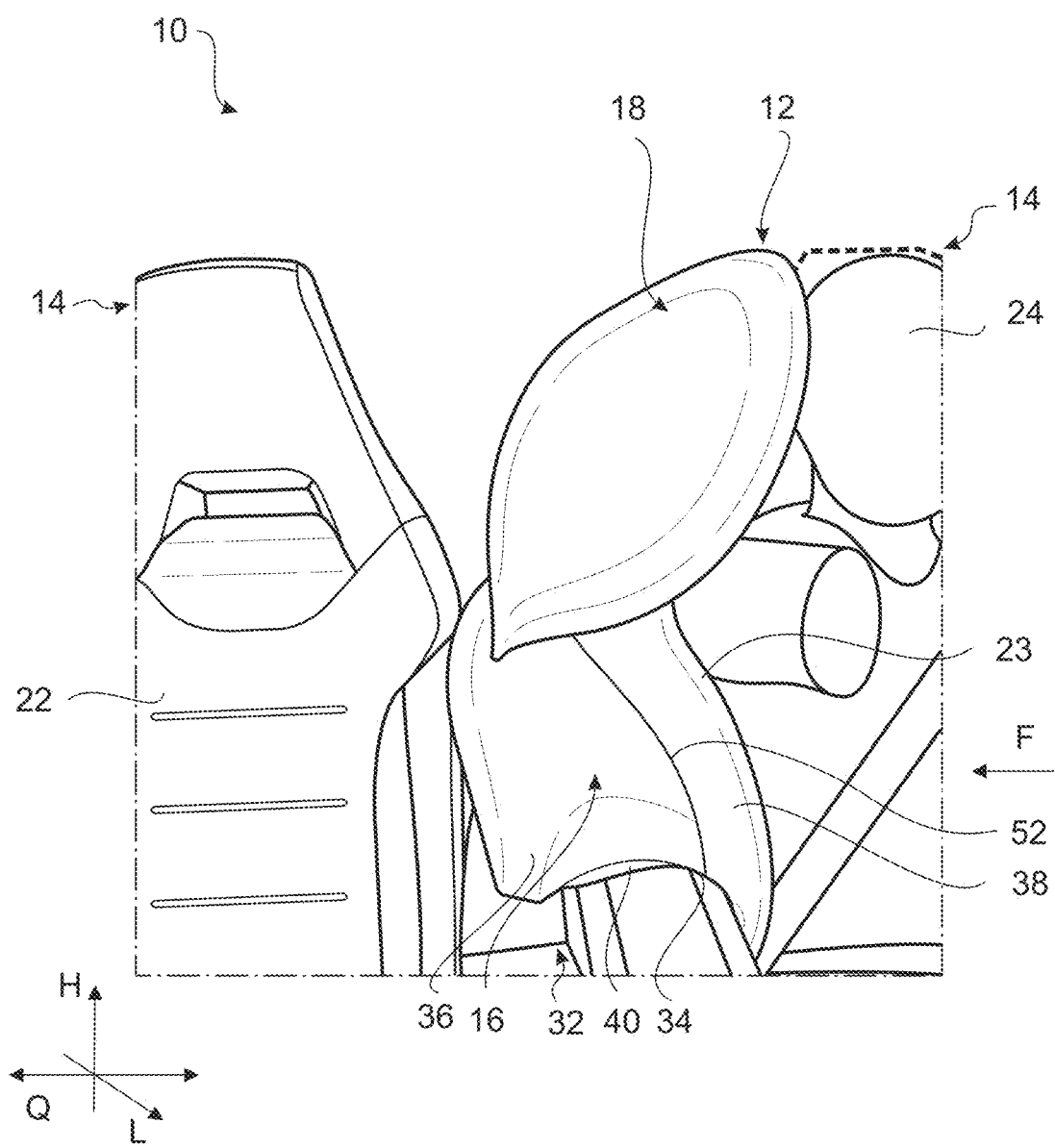
FIG. 1 shows a schematic representation of a vehicle occupant restraint system according to the invention comprising a completely inflated center airbag.

FIG. 1 illustrates a vehicle occupant restraint system 10 of a vehicle (not shown in detail) comprising a center airbag 12 which in the inflated state is located between two vehicle seats 14 arranged next to each other. In this example, the vehicle seats 14 are facing forward along a longitudinal direction of the vehicle L and are positioned next to each other in a transverse direction of the vehicle Q.

The center airbag 12 extends, when substantially inflated, along the longitudinal direction of the vehicle L and a vertical direction of the vehicle H and comprises a torso gas bag 16 as well as a head gas bag 18 connected to the latter. The head gas bag 18 is arranged along the vertical direction of the vehicle H at an upper portion of the torso gas bag 16 and adjoins the latter so that in the vertical direction of the vehicle H it extends farther than the torso gas bag 16. The head gas bag 18 is arranged on the torso gas bag 16 in such a way that in the transverse direction of the vehicle Q it extends toward the vehicle occupant 24.

The center airbag 12 is arranged with an inflation portion 20 (see FIGS. 2 to 4) on a backrest 22 of one of the vehicle seats 14, namely on the side facing the other vehicle seat 14. The center airbag 12 is associated with a vehicle occupant 24 on the vehicle seat 14 to the backrest 22 of which the center airbag 12 is fixed. In this case, the vehicle seat 14 on the right in FIG. 1 is chosen. In particular, said vehicle seat 14 is a driver seat of the vehicle.

The torso gas bag 16 has a baffle 23 facing the vehicle occupant 24 and cushioning the vehicle occupant 24, if a lateral force F, viz. a force acting along the transverse direction of the vehicle Q, acts upon the vehicle occupant 24.

The torso gas bag 16 and the head gas bag 18 form inflatable chambers separate from each other.

Figure 2:
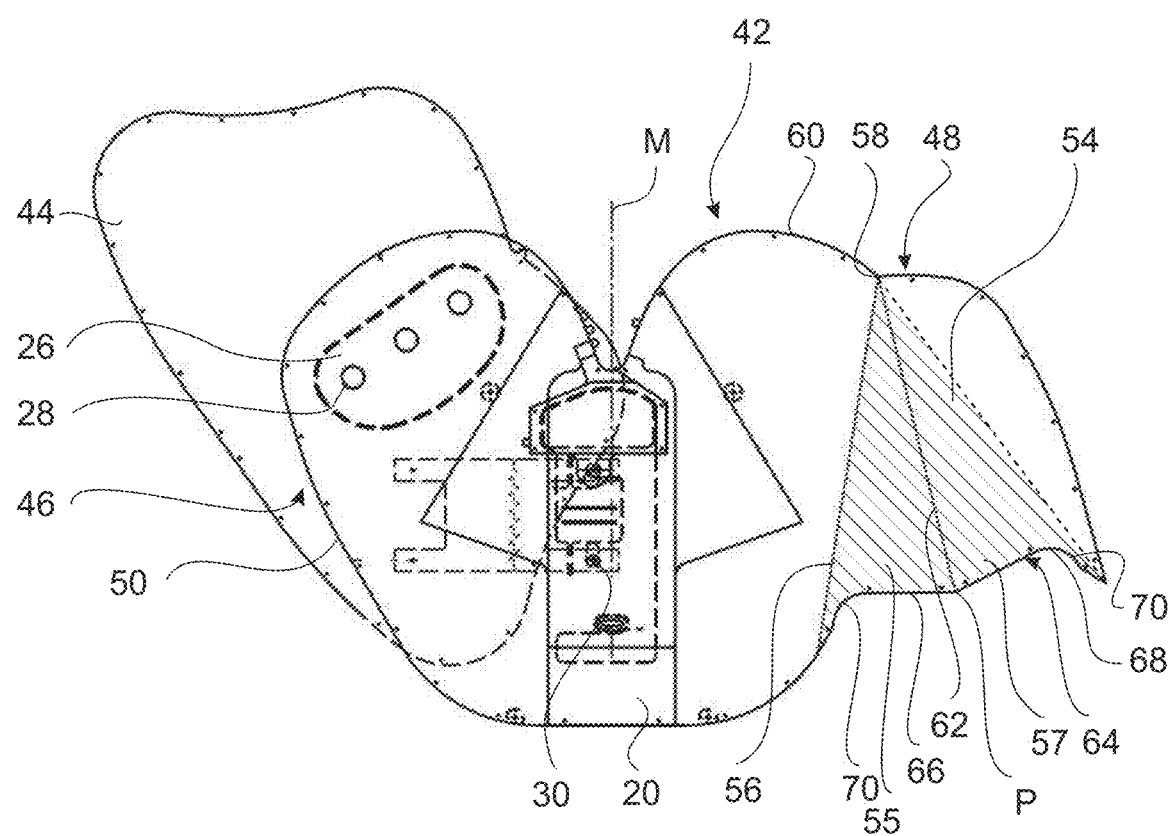
FIG. 2 shows a schematic representation of a cut of the center airbag of FIG. 1.
Figure 3:
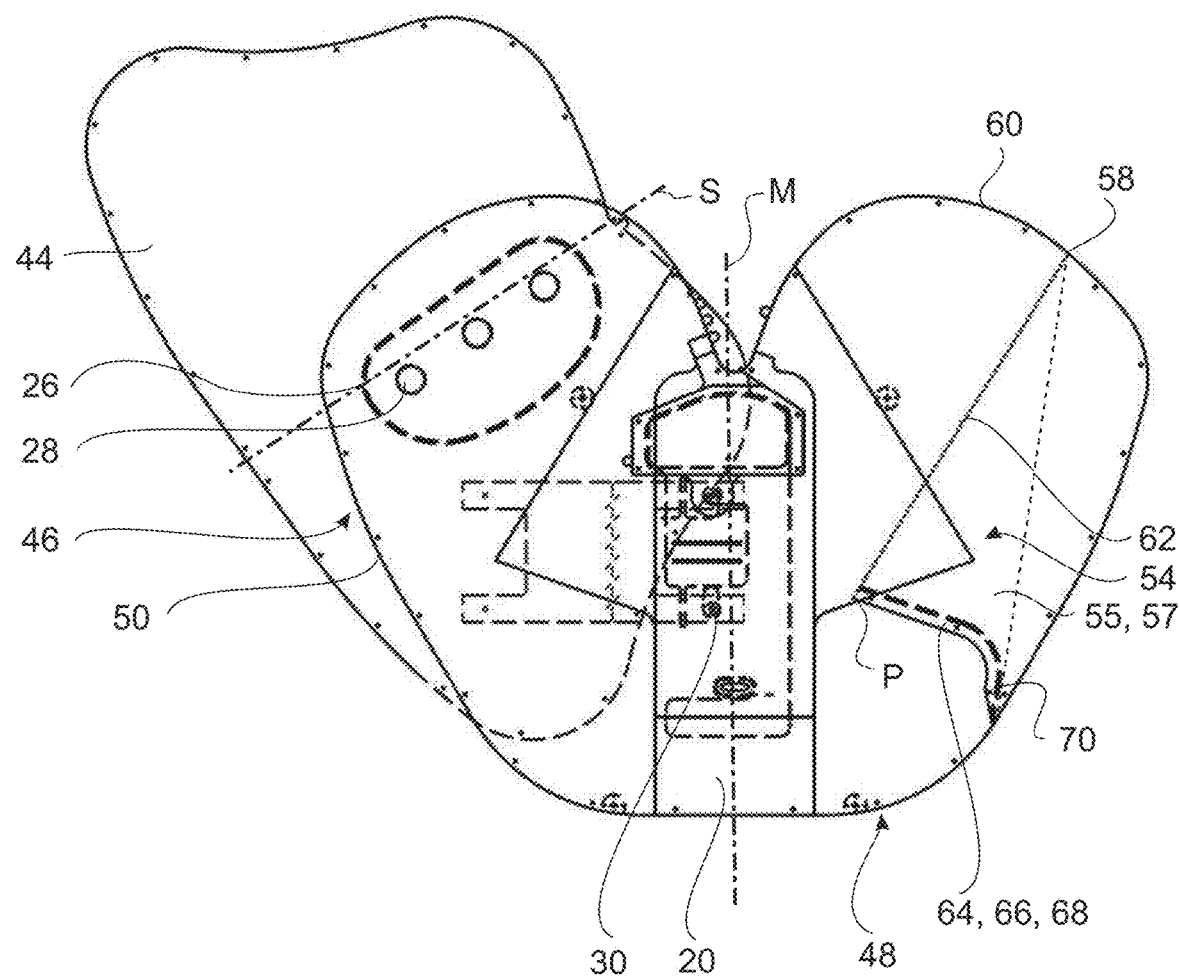
FIG. 3 shows a schematic representation of an intermediate step in manufacturing the center airbag of FIG. 1.
Figure 4:
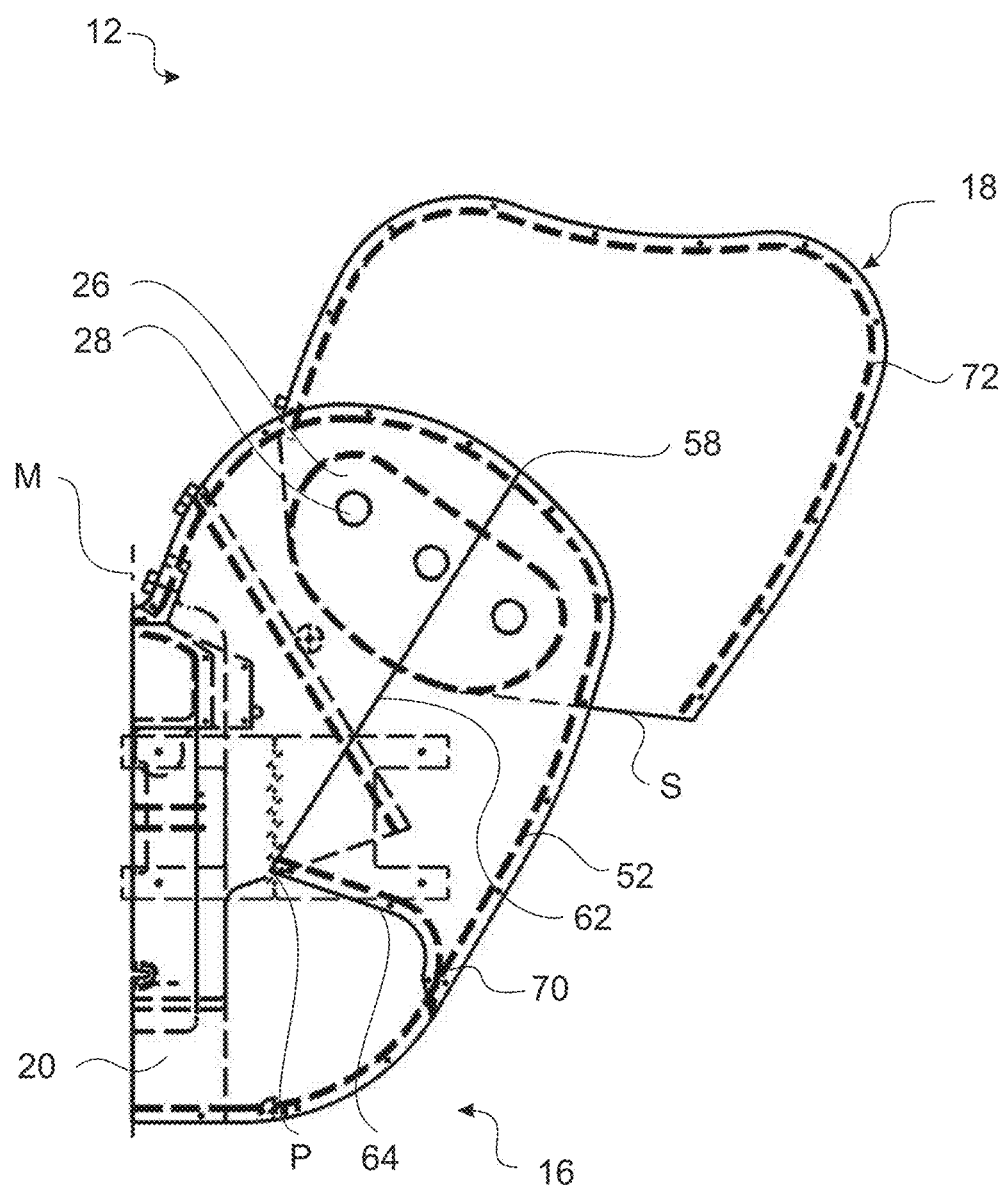
FIG. 4 shows a schematic representation of the completed flatly spread and not inflated center airbag of FIG. 1.

As illustrated in FIGS. 2 to 4, the head gas bag 18 is connected to the torso gas bag 16 at a rear side of the torso gas bag 16 facing away from the vehicle occupant 24 at a connecting area 26. In the connecting area 26, plural overflow openings 28 are arranged through which filling gas passes from the torso gas bag 16 into the head gas bag 18. The filling gas is supplied by an inflator (not shown) connected to the inflation portion 20. In this case, the whole center airbag 12 is fixed to the vehicle seat 14 by means of known fastening holes 30 in the inflation portion 20.

A vehicle structure 32 formed by a center console of the vehicle in this case extends between the two vehicle seats 14. The vehicle structure 32 ends in the vertical direction of the vehicle H in the area of the torso gas bag 16.

The vehicle structure 32 includes an edge or a bulge 34, in this case the transition from an upper side of the center console to a sidewall of the center console facing the vehicle occupant 24.

The torso gas bag 16 of the center airbag 12 comprises an inflatable protrusion 36 which projects from a main part 38 of the torso gas bag 16 and at an angle with the baffle 23 and which, in the inflated center airbag 12, abuts against the vehicle structure 32. In this way, the center airbag 12 is supported against a lateral force F in the transverse direction of the vehicle Q applied by the vehicle occupant 24 when he/she impacts on the center airbag 12.

For this purpose, the inflatable protrusion 36 comprises a contact surface 40 which abuts against the full surface of the edge or bulge 34 of the vehicle structure 32.

The inflatable protrusion 36 is provided on the side of the torso gas bag 16 facing away from the vehicle occupant 24, as can be seen from FIG. 1.

The volume of the inflatable protrusion 36 is definitely smaller than that of the main part 38, such as about 3% to 30%, particularly 3% to 20%.

It is the only function of the inflatable protrusion 36 to support the torso gas bag 16 against the force F at the vehicle structure 32.

In the example shown here, the contact surface 40 is bulged or angled and is adapted to the shape of the surface of the vehicle structure 32 and to that of the edge or bulge 34 at the vehicle structure 32. This results in a full-surface support of the torso gas bag 16 on the vehicle structure 32.

The inflatable protrusion 36 is formed by the shape of the cut of the center airbag 12 (see FIGS. 2 to 4), more precisely by the shape of a cut 42 of the torso gas bag 16.

FIG. 2 illustrates the whole cut of the center airbag 12 including a cut 44 for the head gas bag 18. This is a cut part separate from the cut 42 which in FIG. 2 is placed beneath the cut 42.

The cut 42 of the torso gas bag 16 includes a first portion 46 and a second portion 48 which are connected to each other along a centerline M in one piece.

The head gas bag 18 in this case is fastened to the first portion 46, but it would also be conceivable to arrange it on the second portion 48.

An outer contour 50 of the first portion 46 and the centerline M define a circumferential contour 52 of the torso gas bag 16, as shown in FIG. 4.

The second portion 48 is theoretically composed of a surface which is mirror-inverted to the first portion 46 relative to the centerline M, and of a folding area 54 additionally inserted there (hatched in FIG. 2). Said folding area 54 in the inflated center airbag 12 constitutes the inflatable protrusion 36. In this example, the second portion 48 of the cut 42 is formed integrally and also integrally with the first portion 46.

The folding area 54 in this case takes approximately the shape of an acute isosceles triangle.

The folding area 54 is limited toward the centerline M by a first folding line 56. The latter forms a lateral face of the triangle.

A terminal point 58 of the first folding line 56 is arranged in the area of an outer contour 60 of the second portion 48 which, in the completed center airbag 12, is located on the circumferential contour 52 of the torso gas bag 16. The terminal point 58 in this case forms the vertex of the triangle.

The folding area 54 is mirror-symmetrical relative to a second folding line 62 which extends from the terminal point 58 to a center P of an outer edge portion 64 of the folding area 54 which theoretically divides the outer edge portion 64 into two mirror-symmetrical sub-portions 66, 68.

The shape of the outer edge portion 64 defines the shape of the contact surface 40 of the inflatable protrusion 36. For an angled or curved contact surface 40, e.g. transitions 70 of the outer edge portion 64 into the joint circumferential contour 52 have an angled or curved design.

The surface of the folding area 54 defines the volume of the inflatable protrusion 36 in the inflated center airbag 12, while the length of the outer edge portion 64 is crucial for how far the protrusion 36 projects from the main part 38 of the torso gas bag 16.

In order to form the inflatable protrusion 36, the second portion 48 is folded along the first folding line 56 toward the centerline M, and subsequently the remaining second portion 48 is turned back along the second folding line 62. In doing so, the two sections 55, 57 of the folding area 54 and the two sub-portions 66, 68 of the outer edge portion 64 come to lie on top of each other. This results in the shape shown in FIG. 3.

The two sub-portions 66, 68 of the outer edge portion 64 are connected, such as sewn up, to each other but not to other parts of the cut 42.

Starting from the partly folded cut 42 shown in FIG. 3, the first portion 46 and the second portion 48 are laid on top of each other with the centerline M being the folding line so that the now mirror-inverted outer contours 50, 60 lie on top of each other, and they are connected, such as sewn up, to each other to form the circumferential contour 52.

Since the folding area 54 is folded into the interior of the center airbag 12, in this area an outwardly open pocket is formed which is delimited outwardly by the first folding line 56 and inwardly by the second folding line 62 and the outer edge portion 64 (see also FIG. 4).

For completing the center airbag 12, moreover the cut 44 of the head gas bag 18 is connected, such as sewn up, initially in the connecting area 26 to the upper portion of the first portion 46 of the cut 42 of the torso gas bag 16, wherein the overflow openings 28 which are recessed both in the cut 44 and in the first portion 46 lie on top of each other.

Then the cut 44 is folded along a line of symmetry S and is fastened to itself at a circumferential edge 72 so that the outer contour of the head gas bag 18 is formed.

The now completed center airbag 12 which is shown spread in FIG. 4 can be folded and stored, as is known, at the backrest 22 of the vehicle seat 14.

In the case of restraint, the center airbag 12 deploys out of the backrest 22 into the position between the two vehicle seats 14, wherein both the torso gas bag 16 and the head gas bag 18 are always filled. The gas pressure causes the folding area 54 to be turned outwards and to be filled with filling gas so that the inflatable protrusion 36 projects outwardly from the main part 38 of the torso gas bag 16. Due to the shape and the arrangement of the center airbag 12, the contact surface 40 abuts at the inflatable protrusion 36 against the vehicle structure 32. The torso gas bag 16 is thus spanned between its fastening on the backrest 22 and the contact surface 40 which bears against the vehicle structure 32, and is prepared to take up the lateral force F.

The invention claimed is:

1. A vehicle occupant restraint system comprising a center airbag which, in an inflated state, extends between two vehicle seats positioned next to each other and which includes an inflatable torso gas bag and an inflatable head gas bag connected to the torso gas bag, wherein the torso gas bag has a laterally projecting, as seen in the longitudinal direction of the vehicle (L), inflatable protrusion which is designed and arranged to abut, in the completely inflated state of the center airbag, against a vehicle structure between the vehicle seats and to support the center airbag against a lateral force (F), wherein a cut of the torso gas bag includes first and second portions which, relating to the inflated center airbag, are connected to each other along mirror-inverted outer contours, and wherein the second portion has a folding area which forms the inflatable protrusion in the inflated center airbag, wherein the folding area comprises an outer edge portion which is connected only to itself in superimposed sections of the folding area, and wherein the folding area comprises a first folding line which extends from a terminal point at the circumferential contour of the torso gas bag opposite to the contact surface to a first end of the outer edge portion of the folding area, and a second folding line which extends from the terminal point to a center (P) of the outer edge portion and divides the outer edge portion into two mirror-symmetrical sub-portions.

2. The vehicle occupant restraint system according to claim 1, wherein an angled or curved contact surface which fully abuts against an edge or a bulge of the vehicle structure is formed on the torso gas bag by the inflatable protrusion.

3. The vehicle occupant restraint system according to claim 1, wherein the vehicle structure is a center console of the vehicle.

4. The vehicle occupant restraint system according to claim 1, wherein the center airbag is mounted on a backrest of one of the vehicle seats.

5. The vehicle occupant restraint system according to claim 4, wherein the torso gas bag includes an inflation portion that is fixed to the backrest.

6. The vehicle occupant restraint system according to claim 1, wherein a total area of the second portion of the cut corresponds to a total area of the first portion of the cut plus a surface of the folding area.

7. The vehicle occupant restraint system according to claim 1, wherein the outer edge portion of the folding area is angled or curved and merges into the adjoining portion of the circumferential contour of the torso gas bag.

8. The vehicle occupant restraint system according to claim 1, wherein the head gas bag and the torso gas bag constitute separate inflatable chambers of the center airbag and are fastened to each other in a connecting area which has at least one overflow opening.

\* \* \* \* \*